United States Patent Office 3,075,967
Patented Jan. 29, 1963

3,075,967
BENZOTHIAZINES
John Krapcho, New Brunswick, N.J., assignor to Olin Mathieson Chemical Corporation, New York, N.Y., a corporation of Virginia
No Drawing. Filed June 12, 1961, Ser. No. 116,273
14 Claims. (Cl. 260—239.3)

This application is a continuation-in-part of my application, Serial No. 842,202, filed September 25, 1959, and now abandoned.

This invention relates to new chemical compounds having valuable therapeutic properties and processes for the preparation thereof.

The therapeutically active compounds of this invention are bases of the general Formula I:

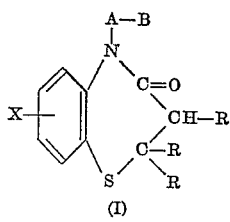

(I)

and the acid-addition salts thereof, wherein X is hydrogen, lower alkyl, lower alkoxy, nitro, halo or trifluoromethyl; each R is hydrogen, lower alkyl, an X-substituted phenyl lower alkyl, an X-substituted phenyl, furyl, thienyl, pyridyl or piperonyl; A is lower alkylene (preferably ethylene and propylene); and B is a basic nitrogen-containing radical of less than twelve carbon atoms. Among the suitable radicals represented by the symbol B are: amino; (lower alkyl)amino; di(lower alkyl)amino; (hydroxy-lower alkyl)amino; di(hydroxy-lower alkyl)amino; phenyl(lower alkyl)amino; N-(lower alkyl)-phenyl (lower alkyl)amino; and saturated 5 to 6 membered monocyclic heterocyclic radicals of less than twelve carbon atoms, as exemplified by piperidino; (lower alkyl) piperidino; di(lower alkyl)piperidino; (lower alkoxy) piperidino; 2, 3 or 4-piperidyl; 2, 3 or 4-(N-lower alkyl-piperidyl); pyrrolidino; (lower aklyl)pyrrolidino; di(lower alkyl)pyrrolidino; (lower alkoxy)pyrrolidino; 2 or 3-pyrrolidyl; 2 or 3-(N-lower alkyl-pyrrolidyl); morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; (lower alkyl) piperazino (e.g., N⁴-methylpiperazino); di(lower alkyl) piperazino; and (lower alkoxy) piperazino. The terms "lower alkyl," "lower alkoxy," and "lower alkylene," as employed herein, include both straight and branched chain radicals of less than eight carbon atoms. The particularly preferred compounds are those wherein X is hydrogen or chloro, one R is phenyl, A is ethylene or propylene and B is di(lower alkyl)amino.

As to the salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric and hydrobromic acid), sulfuric acid, nitric acid, boric acid and phosphoric acid, and organic acids such as oxalic, tartaric, citric, acetic and succinic acid, theophylline and 8-chlorotheophylline.

The compounds of this invention and the acid-addition salts thereof are therapeutically active compounds which are utilizable in the treatment of Parkinsonism. Thus, the compounds of this invention can be administered perorally in the same manner as benztropine methanesulfonate in the treatment of Parkinsonism, the dosage for such treatment being adjusted for the activity of the particular compound employed. In addition, the compounds of this invention are useful as tranquilizers and thus can be administered perorally in the same manner as Chlordiazepoxide in the treatment of irrational fears, anxiety and tension, the dosage for such treatment being adjusted for the activity of the particular compound employed.

The compounds of this invention can be prepared by condensing a compound of the Formula II:

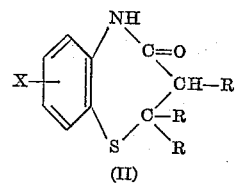

(II)

wherein X and R are as hereinbefore defined, with an aminoalkyl halide of the formula B—A—Y, wherein B and A are as hereinbefore defined and Y is halide, particularly chloride. This reaction is preferably conducted by heating the reactants in the presence of a basic condensing agent, such as an alkali metal, an alkali metal amide (e.g., sodamide), or an alkali metal hydroxide. To form the acid-addition salts, the free base initially formed is interacted with at least one equivalent of the desired acid.

To prepare the starting materials (the compounds of Formula II) a 2-aminothiophenol of the Formula III:

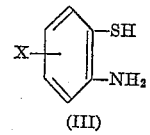

(III)

wherein X is as hereinbefore defined, is interacted with an acrylic acid derivative of the Formula IV:

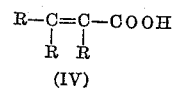

(IV)

wherein R is as hereinbefore defined.

Suitable reactants III include 2-aminobenzenethiol; 2-amino-(lower alkyl)benzenethiols, such as 2-aminotoluenethiols, (e.g., 2-amino-p-toluenethiol), 2-amino-ethylbenzenethiols, 2-amino-n-propylbenzenethiols, 2-amino-isopropylbenzenethiols, 2-aminobutylbenzenethiols, and 2-aminohexylbenzenethiols; 2-amino-lower alkoxybenzenethiols, such as 2-amino-methoxybenzenethiols (e.g., 2-amino-p-anisolethiol), 2-amino-ethoxybenzenethiols, 2-amino-n-propoxybenzenethiols, and 2-amino-pentoxybenzenethiols; 2-aminonitrobenzenethiols (e.g., 2-amino-n-nitrobenzenethiol); 2-amino-halobenzenethiols, such as 2-amino-chlorobenzenethiols (e.g., 2-amino-4-chlorobenzenethiol), 2-amino-bromobenzenethiols and 2-amino-fluorobenzenethiols; and 2-amino-trifluoromethylbenzenethiols, such as 2-amino-4-trifluoromethylbenzenethiol.

Suitable reactants IV include acrylic acid; α-lower alkenoic acids of more than three carbon atoms (e.g., crotonic acid, 2-pentenoic acid, 2-hexenoic acid, 2-octenoic acid, 3-methylcrotonic acid, 2-methylcrotonic acid, 2-ethylacrylic acid, 2,3-dimethylcrotonic acid and 4-methyl-2-pentenoic acid); 3-phenyl-α-lower alkenoic acids of more than two carbon atoms (e.g., cinnamic acid, 3-phenylcrotonic acid, 3-phenyl-2-pentenoic acid, 3-phenyl-2-hexenoic acid, 2-methylcinnamic acid, 2-ethylcinnamic acid and 3-phenyl-4-methyl-2-pentenoic acid); 3-(substituted phenyl)-α-lower alkenoic acids of more than two carbon atoms (e.g., m-nitrocinnamic acid, p-methylcinnamic acid, o,α-dimethylcinnamic acid, p-ethylcinnamic acid, m,p-dimethoxycinnamic acid, p-methoxycinnamic acid, 2-ethylp-ethoxycinnamic acid, p-trifluoromethylcinnamic acid, p-chlorocinnamic acid, 3-o-tolylcrotonic acid and 3-p-methoxyphenyl-2-pentenoic acid); 3-(phenyl-lower alkyl)-α-lower alkenoic acids of more than two carbon atoms (e.g., ω-phenyl-α-lower alkenoic acids of more than three carbon atoms, such as 5-phenyl-2-pentenoic acid 5-phenyl-2-methyl-2-pentenoic acid, and 6-phenyl-2-hexenoic acid) and lower alkyl, lower alkoxy, nitro, halo and trifluoromethyl substituted phenyl derivatives thereof; 3-piperonyl-α-lower alkenoic acids of more than two carbon atoms (e.g., 3-piperonylacrylic acid, 3-piperonyl-2-methyl acrylic acid, and 3-piperonylcrotonic acid); 3-(2-furyl)-α-lower alkenoic acids of more than two carbon atoms [e.g., 3-(2-furyl)acrylic acid, 3-(2-furyl)-2-ethyl acrylic acid and 3-(2-furyl)crotonic acid]; 3-(2-thienyl)-α-lower alkenoic acids of more than two carbon atoms [e.g., 3-(2-thienyl)-acrylic acid, 3-(2-thienyl)-2-methyl crotonic acid and 3-(2-thienyl)-crotonic acid]; 3-(2-pyridyl)-α-lower alkenoic acids of more than two carbon atoms [e.g., 3-(2-pyridyl)acrylic acid, 3-(2-pyridyl)-2-methylacrylic acid and 3-(2-pyridyl)crotonic acid]; 3-(4-pyridyl)-α-lower alkenoic acids of more than two carbon atoms [e.g., 3-(4-pyridyl)acrylic acid and 3-(4-pyridyl)crotonic acid]; 2-phenyl-α-lower alkenoic acids of more than two carbon atoms (e.g., α-phenylacrylic acid, α-phenylcrotonic acid, 2-phenyl-2-pentenoic acid, and 2-phenyl-2-hexenoic acid); 2-(substituted phenyl)-α-lower alkenoic acids of more than two carbon atoms; 2-(phenyl-lower alkyl)-α-lower alkenoic acids of more than two carbon atoms (e.g., 2-benzylacrylic acid and 2-phenethylcrotonic acid); 2-(substituted phenyl-lower alkyl)-α-lower alkenoic acids of more than two carbon atoms; 3,3-diphenylacrylic acid; 2,3-diphenylacrylic acid; 2,3,3-triphenylacrylic acid; 2,3-diphenyl-α-lower alkenoic acids of more than two carbon atoms; 3,3-diphenyl-α-lower alkenoic acids of more than two carbon atoms; 2,3,3-triphenyl-α-lower alkenoic acids of more than two carbon atoms; 3-(substituted phenyl)-3-phenyl-α-lower alkenoic acids of more than two carbon atoms; 3,3-di(substituted phenyl)-α-lower alkenoic acids of more than two carbon atoms; 2-(substituted phenyl)-3-phenyl-α-lower alkenoic acids of more than two carbon atoms; 2,3-di(substituted phenyl)-α-lower alkenoic acids of more than two carbon atoms; 3-(phenyl-lower alkyl)-2-phenyl-α-lower alkenoic acids of more than two carbon atoms; 2-piperonyl-α-lower alkenoic acids of more than two carbon atoms; 2-(2-furyl)-α-lower alkenoic acids of more than two carbon atoms; 2-(2-thienyl)-α-lower alkenoic acids of more than two carbon atoms; 2-(2-pyridyl)-α-lower alkenoic acids of more than two carbon atoms; and 2-(4-pyridyl)-α-lower alkenoic acids of more than two carbon atoms.

The following examples illustrate the invention (all temperatures being in centigrade):

EXAMPLE 1

*2,3-Dihydro-5-(2-Dimethylaminoethyl)-2-Phenyl-1,5-Benzothiazepin-4-one Hydrochloride*

To a stirred suspension of 7.8 g. of sodamide in 500 ml. of dry toluene is added a suspension of 50.8 g. of 2,3-dihydro-2-phenyl-1,5-benzothiazepin-4-one (J.C.S., 1927, p. 2738) in 500 ml. of toluene. The resulting mixture is stirred at room temperature for thirty minutes and the resulting solution treated with a solution of 25.0 g. of 2-dimethylaminoethyl chloride in 110 ml. of toluene. This mixture is heated and maintained at 60–65° for a period of three hours, cooled and treated with 150 ml. of water. The aqueous layer is discarded and the organic phase added to a cold solution of 25 ml. of concentrated hydrochloric acid in 300 ml. of water. The mixture is shaken and the solid which separates is filtered and the cooled filtrate treated with a solution of 18 g. of sodium hydroxide in 50 ml. of water. The liberated base is extracted three times with 600 ml. portions of ether and the combined ether extract washed twice with 100 ml. portions of water and dried over magnesium sulfate. After evaporation of the solvent, there remains about 43 g. of 2,3-dihydro-5-(dimethylaminoethyl)-2-phenyl-1,5 - benzothiazepin - 4-one. Part of this material (36.5 g.) is dissolved in 50 ml. of ethanol and treated with 18.7 ml. of 6 N alcoholic hydrogen chloride. Dilution of the resulting solution gives about 39.5 g. of colorless product; M.P. about 195–205°. Crystallization from 600 ml. of acetonitrile gives a colorless product; M.P. about 222–224°.

EXAMPLE 2

*2,3-Dihydro-5-(3-Dimethylaminopropyl)-1,5-Benzothiazepin-4-One-Hydrochloride, Monohydrate*

To a suspension of 7.8 g. of sodamide in 200 ml. of toluene is added a suspension of 33.5 g. of 2,3-dihydro-1,5-benzothiazepin-4-one (J.C.S., 1927, p. 2738) in 300 ml. of toluene. This mixture is refluxed for one hour, cooled and treated with 25.5 g. of 3-dimethylaminopropyl chloride. The mixture is refluxed for two hours and the product is isolated as in Example 1 to give about 11.0 g. of 2,3-dihydro-5-(3-dimethylaminopropyl)-1,5-benzothiazepin-4-one, B.P. about 164° (0.4 mm.). Part of this material (10.1 g.) is dissolved in 20 ml. of absolute alcohol and treated with an equivalent of hydrogen chloride in 7 ml. of absolute alcohol. The resulting solution is diluted to 400 ml. with anhydrous ether to give an oil. Tritration with ether gives a colorless product weighing about 11.0 g., M.P. about 101–105°. After crystallization from 20 ml. of acetonitrile, the colorless product melts at about 106–108°.

EXAMPLE 3

*2,3-Dihydro-2-Phenyl-5-(2-Diethylaminoethyl)-1,5-Benzothiazepin-4-One Hydrochloride*

Following the procedure used in Example 1 but substituting an equivalent amount of 2-diethylaminoethyl chloride for the 2-dimethylaminoethyl chloride, a colorless product melting at about 179–180° is obtained.

EXAMPLE 4

*2,3-Dihydro-2-Phenyl-5-[2-(1-Pyrrolidinyl)ethyl]-1,5-Benzothiazepin-4-One Hydrochloride*

Following the procedure used in Example 1 but substituting an equivalent amount of 2-(1-pyrrolidinyl)ethyl chloride for 2-dimethylaminoethyl chloride, a colorless product melting at about 193–195° is obtained.

EXAMPLE 5

*2,3-Dihydro-2-Phenyl-5-(3-Dimethylaminopropyl)-1,5-Benzothiazepin-4-One Hydrochloride*

Following the procedure used in Example 1 but substituting an equivalent amount of 3-dimethylaminopropyl chloride for 2-dimethylaminoethyl chloride, a colorless product which crystallizes from butanone and melts at about 127–129° is obtained.

EXAMPLE 6

*2,3-Dihydro-2-Phenyl-5-[2-(N-Methyl-N-Phenethylamino)ethyl]-1,5-Benzothiazepin-4-One Hydrochloride*

Substitution of an equivalent quantity of 2-(N-methyl-N-phenethylamino)ethyl chloride for the 2-dimethylaminoethyl chloride in Example 1 gives 2,3-dihydro-2-phenyl - 5 - [2 - (N - methyl) - N - phenethylamino)ethyl]-1,5-benzothiazepin-4-one hydrochloride.

EXAMPLE 7

*2,3-Dihydro-2-Methyl-3-Phenyl-5-(2-Dimethylaminoethyl)-1,5-Benzothiazepin-4-One Hydrochloride*

(a) *Preparation of 2,3-dihydro-2-methyl-3-phenyl-1,5-benzothiazin-4-one.*—A mixture of 26.4 α-phenylcrotonic acid (J.A.C.S. 53, 3541 (1931)), and 15.7 g. of 2-aminothiophenol is heated in an oil bath at 160–175° for one hour. The mixture is cooled and purified by crystallization from isopropyl alcohol and acetonitrile to give a colorless solid; M.P. about 206–207°.

(b) *Preparation of 2,3-dihydro-2-methyl-3-phenyl-5-(2-dimethylaminoethyl)1,5-benzothiazepin-4-one hydrochloride.*—19.0 g. of 2,3-dihydro-2-methyl-3-phenyl-1,5-benzothiazepin-4-one is reacted with 2.7 g. of sodamide and 7.6 g. of 2-dimethylaminoethyl chloride according to the procedure described in Example 1. This colorless material, obtained after crystallization from absolute alcohol, melts at about 239–240°.

EXAMPLE 8

*2,3-Dihydro-2-Methyl-5-(2-Diethylaminoethyl)-1,5-Benzothiazepin-4-One Hydrochloride*

35.4 g. of 2,3-dihydro-2-methyl-1,5-benzothiazin-4-one (J.C.S.,1927, p. 2738) is reacted with 8.7 g. of sodamide and 31.0 g. of 2-diethylaminoethyl chloride according to the procedure described in Example 1 to give about 43.5 g. of colorless solid; M.P. about 170–173°. After crystallization from 300 ml. ethanol-600 ml. of ethyl ether, the product melts at about 175–176°.

EXAMPLE 9

*2,3-Dihydro-2-(3,4-Dimethoxyphenyl)-5-(2-Diethylaminoethyl)-1,5-Benzothiazepin-4-One Hydrochloride*

(a) *Preparation of 2,3-dihydro-2-(3,4-dimethoxyphenyl)-1,5-benzothiazepin-4-one.*—A mixture of 104 g. of 3,4-dimethoxycinnamic acid and 62 g. of 2-aminobenzenethiol is heated in an oil bath at 175–185° for one hour at forty-five minutes. After cooling, the residue is purified by crystallization from acetonitrile to give a colorless product; M.P. about 160–162°.

(b) *Preparation of 2,3-dihydro-2-(3,4-dimethoxyphenyl)-5-(2-diethylaminoethyl)-1,5-benzothiazepin-4-one hydrochloride.*—34.5 g. of 2,3-dihydro-2-(3,4-dimethoxyphenyl)-1,5-benzothiazepin-4-one is reacted with 4.3 g. of sodamide and 15 g. of 2-diethylaminoethyl chloride according to the procedure described in Example 1. This product, after crystallization from acetonitrile, melts at about 179–181°.

EXAMPLE 10

*2,3-Dihydro-2-(p-Methoxyphenyl)-5-(2-Dimethylaminoethyl)-1,5-Benzothiazin-4-One Hydrochloride*

(a) *Preparation of 2,3-dihydro-2-(p-methoxyphenyl)-1,5-benzothiazepin-4-one.*—A mixture of 64 g. of p-methoxycinnamic acid (Ber. 60, 2112 (1927)), and 45 g. of 2-aminobenzenethiol is heated in an oil bath at 195–200° for one hour and fifteen minutes. The mixture is cooled and purified by crystallization from 95% alcohol; M.P. about 120–122°.

(b) *Preparation of 2,3-dihydro-2-(p-methoxyphenyl)-5-(2-dimethylaminoethyl) - 1,5 - benzothiazepin-4-one hydrochloride.*—47.0 g. of 2,3-dihydro-2-(p-methoxyphenyl)-1,5-benzothiazepin-4-one is reacted with 6.2 g. of sodamide and 21 g. of 2-dimethylaminoethyl chloride according to the procedure described in Example 1. This material, after crystallization from acetonitrile, melts at about 210–212°.

EXAMPLE 11

*2,3-Dihydro-2-(o-Methoxyphenyl)-5-(2-Dimethylaminoethyl)-1,5-Benzothiazepin-4-One Hydrochloride*

Following the procedure of steps (a) and (b) of Example 10 but substituting o-methoxycinnamic acid for the p-methoxycinnamic acid in step (a), 2,3-dihydro-2-(o-methoxyphenyl)-5-(2-dimethylaminoethyl) - 1,5 - benzothiazepin-4-one is obtained as a colorless solid; M.P. about 118–120°.

EXAMPLE 12

*2,3-Dihydro-2-(p-Chlorophenyl)-5-(2-Dimethylaminoethyl)-1,5-Benzothiazepin-4-One Hydrochloride*

(a) *Preparation of 2,3-dihydro-2-(p-chlorophenyl)-1,5-benzothiazepin-4-one.*—A mixture of 173 g. of p-chlorocinnamic acid and 119 g. of 2-aminobenzenethiol is heated in an oil bath for two hours at 180–200°. After cooling, the product is purified by crystallization from dimethylformamide, M.P. about 204–205°.

(b) *2,3-dihydro-2-(p-chlorophenyl)-5-(2-dimethylaminoethyl)-1,5-benzothiazepin-4-one hydrochloride.*—8.7 g. of 2,3-dihydro-2-(p-chlorophenyl)-1,5-benzothiazepin-4-one is reacted with 1.25 g. of sodamide and 3.8 g. of 2-dimethylaminoethyl chloride according to the procedure described in Example 1. This material, after purification from acetonitrile, melts at about 205–206°.

EXAMPLE 13

*2,3-Dihydro-2-(p-Methylphenyl)-5-(2-Dimethylaminoethyl)-1,5-Benzothiazepin-4-One Hydrochloride*

(a) *Preparation of 2,3 - dihydro-2-(p-methylphenyl)-1,5-benzothiazepin-4-one.*—A mixture of 90 g. of p-methylcinnamic acid and 70 g. of 2-aminothiophenol is heated in an oil bath. This mixture is purified by crystallization from dimethylformamide to give a colorless solid; M.P. about 200–202°.

(b) *Preparation of 2,3-dihydro-2-(p-methylphenyl)-5-(2-dimethylaminoethyl)-1,5-benzothiazepin-4-one hydrochloride.*—33.0 g. of 2,3-dihydro-2-(p-methylphenyl)-1,5-benzothiazepin-4-one is reacted with 5.0 g. of sodamide and 16.0 g. of 2-dimethylaminoethyl chloride according to the procedure described in Example 1. This material, after purification from acetonitrile and ethanol, melts at about 213–215°.

EXAMPLE 14

*2,3-Dihydro-2-(2-Furyl)-5-(2-Dimethylaminoethyl)-1,5-Benzothiazepin-4-One Hydrochloride*

(a) *Preparation of 2,3-dihydro-2-(2-furyl)-1,5-benzothiazepin-4-one.*—A mixture of 42 g. of 2-furanacrylic acid and 38 g. of 2-aminobenzenethiol is heated in an oil bath at 170–180° for one hour. After cooling, the product is purified by crystallization from acetonitrile to give a colorless product; M.P. about 154–156°.

(b) *Preparation of 2,3 - dihydro-2-(2-furyl)-5-(2-dimethylaminoethyl)-1,5-benzothiazepin-4-one hydrochloride.*—12 g. of 2,3-dihydro-2-(2-furyl)-1,5-benzothiazepin-4-one is reacted with 2.0 g. of sodamide and 6.1 g. of 2-dimethylaminoethyl chloride according to the procedure described in Example 1. The colorless product, after crystallization from butanone and acetonitrile, melts at about 196–198°

EXAMPLE 15

*2,3-Dihydro-2-(3-Piperonyl)-5-(2-Dimethylaminoethyl)-1,5-Benzothiazepin-4-One Hydrochloride*

Following the procedure of steps (a) and (b) of Example 14 but substituting an equivalent quantity of 3-piperonylacrylic acid for the 2-furylacrylic acid in step (a), 2,3 - dihydro-2-(3-piperonyl)-5-dimethylaminoethyl-1,5-benzothiazepin-4-one hydrochloride is obtained.

Similarly, by following the procedure of Example 14 but substituting 2-(4-pyridyl)-acrylic acid, 3-(2-pyridyl)-acrylic acid and 3-(2-thienyl)acrylic acid for the 3-(2-furyl)acrylic acid in step (a), 2,3-dihydro-3-(4-pyridyl)-5-(2-dimethylaminoethyl) - 1,5 - benzothiazepin-4-one hydrochloride, 2,3-dihydro-2-(2-pyridyl)-5-(2-dimethylaminoethyl)-1,5-benzothiazepin-4-one hydrochloride, and 2,3-dihydro - 2 - (2-thienyl) - 5 - (2-dimethylaminoethyl)-1,5-benzothiazepin-4-one hydrochloride are obtained, respectively.

EXAMPLE 16

*2,3-Dihydro-5-(2-Morpholinoethyl)-2-Phenyl-1,5-Benzothiazepin-4-One Hydrochloride*

Following the procedure of Example 1 but substituting an equivalent amount of 2-morpholinoethyl chloride for the 2-dimethylaminoethyl chloride, 2,3-dihydro-5-(2-morpholinoethyl) - 2 - phenyl-1,5-benzothiazepin-4-one hydrochloride is obtained.

EXAMPLE 17

*2,3-Dihydro-5-(2-Piperidinoethyl)-2-Phenyl-1,5-Benzothiazepin-4-One Hydrochloride*

Following the procedure of Example 1 but substituting an equivalent amount of 2-piperidinoethyl chloride for the 2-dimethylaminoethyl chloride, 2,3-dihydro-5-(2-piperidinoethyl)-2-phenyl-1,5-benzothiazepin-4-one hydrochloride is obtained.

EXAMPLE 18

*2,3-Dihydro-5-[3-(4-Methyl-1-Piperazinyl)Propyl]-2-Phenyl-1,5-Benzothiazepin-4-One Hydrochloride*

Following the procedure of Example 1 but substituting an equivalent amount of 1-methyl-4-(3-chloropropyl) piperazine for the 2-dimethylaminoethyl chloride, 2,3-dihydro-5-[3-(4-methyl-1 - piperazinyl)propyl] - 2 - phenyl-1,5-benzothiazepin-4-one hydrochloride is obtained.

EXAMPLE 19

*2,3-Dihydro-5-(2-Diethylaminoethyl)-2-Ethyl-2-Phenyl-1,5-Benzothiazepin-4-One Hydrochloride*

Following the procedure of Example 9 but substituting an equivalent amount of β-ethylcinnamic acid for the 3,4-dimethoxycinnamic acid in step (a), 2,3-dihydro-5-(2-diethylaminoethyl)-2-ethyl-2-phenyl-1,5 - benzothiazepin-4-one hydrochloride is obtained.

EXAMPLE 20

*7-Chloro-2,3-Dihydro-2-Phenyl-5-(2-Diethylaminoethyl)-1,5-Benzothiazepin-4-One Hydrochloride*

Following the procedure of Example 9 but substituting an equivalent amount of cinnamic acid for the 3,4-dimethoxycinnamic acid and an equivalent amount of 2-amino-4-chlorothiophenol for the 2-aminobenzenethiol in step (a), 7-chloro-2,3-dihydro-2-phenyl-5-(2 - diethylaminoethyl)-1,5-benzothiazepin-4-one hydrochloride is obtained.

EXAMPLE 21

*7-Methyl-2,3-Dihydro-2-Phenyl-5-(2-Diethylaminoethyl)-1,5-Benzothiazepin-4-One Hydrochloride*

Following the procedure of Example 9 but substituting an equivalent amount of cinnamic acid for the 3,4-dimethoxycinnamic acid and an equivalent amount of 2-amino-4-toluenethiol for the 2-aminobenzothiol in step (a), 7-methyl - 2,3 - dihydro - 2 - phenyl - 5 - (2-diethylaminoethyl)-1,5-benzothiazepin-4-one hydrochloride is obtained.

EXAMPLE 22

*7-Methoxy-2,3-Dihydro-2-Phenyl-5-(2-Diethylaminoethyl)1,5-Benzothiazepin-4-One Hydrochloride*

Following the procedure of Example 9 but substituting an equivalent amount of cinnamic acid for the 3,4-dimethoxycinnamic acid and an equivalent amount of 2-amino-4-anisolethiol for the 2-aminobenzenethiol in step (a), 7-methoxy-2,3-dihydro - 2 - phenyl - 5 - (2 - diethylaminoethyl)-1,5-benzothiazepin-4-one hydrochloride is obtained.

EXAMPLE 23

*7-(Trifloromethyl)-2,3-Dihydro-2-Phenyl-5-(2-Diethylaminoethyl)-1,5-Benzothiazepin-4-One Hydrochloride*

Following the procedure of Example 9 but substituting an equivalent amount of cinnamic acid for the 3,4-dimethoxycinnamic acid and an equivalent amount of 2-amino-4-(trifluoromethyl)-thiophenol for the 2-aminobenzenethiol in step (a), 7-(trifluoromethyl)-2,3-dihydro-2-phenyl-5-(2-diethylaminoethyl) - 1,5 - benzothiazepin - 4-one hydrochloride is obtained.

The invention may be variously otherwise embodied within the scope of the appended claims.

What is claimed is:

1. A compound selected from the group consisting of bases of the formula

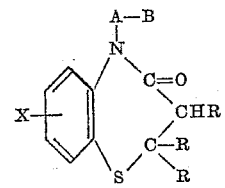

and pharmaceutically-acceptable acid addition salts thereof, wherein X is selected from the group consisting of hydrogen, lower alkyl, lower alkoxy, nitro, halo and trifluoromethyl; each R is selected from the group consisting of hydrogen, lower alkyl, mono-X-substituted phenyl-lower alkyl, di - X - substituted phenyl - lower alkyl, mono - X-substituted phenyl, di - X - substituted phenyl, furyl, thienyl, pyridyl and piperonyl; A is lower alkylene; and B is selected from the group consisting of amino, (lower alkyl)amino, di(lower alkyl)amino, (hydroxy-lower alkyl)amino, di(hydroxy-lower alkyl)amino, phenyl (lower alkyl)amino, N-(lower alkyl)phenyl(lower alkyl) amino, piperidyl, (lower alkyl)piperidyl, di(lower alkyl) piperidino, (lower alkoxy)piperidino, pyrrolidyl, (lower alkyl)pyrrolidyl, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)thiamorpholino, di-(lower alkyl)thiamorpholino, (lower alkoxy)thiamorpholino, piperazino, (lower alkyl)piperazino, di(lower alkyl)piperazino and (lower alkoxy)piperazino.

2. A compound of the formula

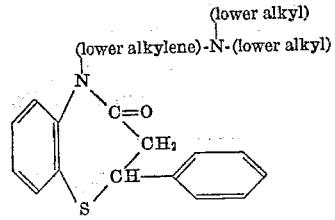

3. A pharmaceutically-acceptable acid-addition salt of the compound of claim 2.

4. A compound of the formula

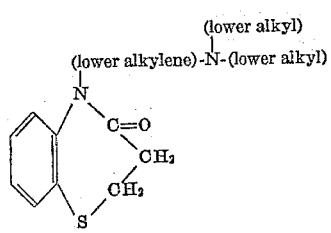

5. A pharmaceutically-acceptable acid-addition salt of the compound of claim 4.

6. A compound of the formula

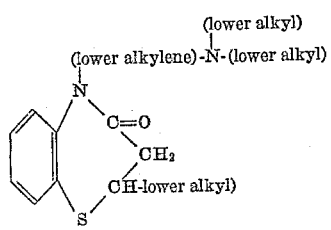

7. A pharmaceutically-acceptable acid-addition salt of the compound of claim 6.

8. A compound of the formula

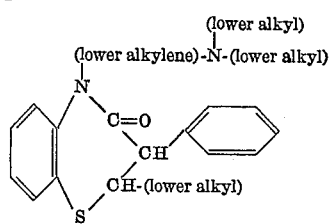

9. A pharmaceutically-acceptable acid-addition salt of the compound of claim 8.

10. A pharmaceutically-acceptable acid-addition salt of 2,3-dihydro-5-(2 - dimethylaminoethyl) - 2 - phenyl - 1,5-benzothiazepin-4-one.

11. A pharmaceutically-acceptable acid-addition salt of 2,3-dihydro - 2 - phenyl - 5 - (2 - diethylaminoethyl) - 1,5-benzothiazepin-4-one.

12. A pharmaceutically-acceptable acid addition salt of 2,3 - dihydro - 2 - phenyl - 5 - [2,(1 - pyrrolidinyl)ethyl]-1,5-benzothiazepin-4-one.

13. A pharmaceutically-acceptable acid-addition salt of 2,3 - dihydro - 2 - phenyl - 5 - (3 - dimethylaminopropyl)-1,5-benzothiazepin-4-one.

14. A pharmaceutically-acceptable acid-addition salt of 2,3 - dihydro - 2 - phenyl - 5 - [2 - (N - methyl - N - phenethylamino)ethyl]-1,5-benzothiazepin-4-one.

References Cited in the file of this patent

UNITED STATES PATENTS 2,852,510    Hoffmann et al. _____ Sept. 16, 1958